United States Patent
Lindley et al.

(10) Patent No.: US 12,235,946 B1
(45) Date of Patent: *Feb. 25, 2025

(54) VIRTUAL NOTARIZATION USING CRYPTOGRAPHIC TECHNIQUES AND BIOMETRIC INFORMATION

(71) Applicant: United Services Automobile Association (USAA), San Antonio, TX (US)

(72) Inventors: David Lindley, Boerne, TX (US); Alexander Benetto Nagelberg, San Antonio, TX (US); Maland Keith Mortensen, San Antonio, TX (US); Joseph Gregory Delong, Humble, TX (US); Shantanu K. Tripathy, San Antonio, TX (US); Zachary T. Golden, San Antonio, TX (US); Kevin D. Love, II, San Antonio, TX (US); Brian Keith Anderson, San Antonio, TX (US); Kasey T. Moore, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,959

(22) Filed: Sep. 12, 2023

Related U.S. Application Data

(63) Continuation of application No. 17/523,822, filed on Nov. 10, 2021, now Pat. No. 11,790,067, which is a
(Continued)

(51) Int. Cl.
*G06F 21/32* (2013.01)
*G06F 21/60* (2013.01)
(Continued)

(52) U.S. Cl.
CPC .............. *G06F 21/32* (2013.01); *G06F 21/60* (2013.01); *H04L 9/0866* (2013.01); *H04L 63/12* (2013.01); *G06F 16/93* (2019.01); *H04L 9/50* (2022.05)

(58) Field of Classification Search
None
See application file for complete search history.

(56) References Cited

U.S. PATENT DOCUMENTS

| | | |
|---|---|---|
| 5,189,700 A | 2/1993 | Blandford |
| 5,748,740 A | 5/1998 | Curry et al. |

(Continued)

*Primary Examiner* — Michael W Chao
(74) *Attorney, Agent, or Firm* — Perkins Coie LLP

(57) ABSTRACT

Methods and systems described in this disclosure electronically notarize a document. The system can receive biometric information from a user, extract characteristics from the biometric information, and compare the characteristics of the biometric information with previously stored characteristics of the user's biometric information. When the characteristics of the biometric information match the previously stored characteristics to a threshold, the system can create an identity of the user using the characteristics of the biometric information. The system can send a document to the user for cryptographic signature and receive an indication that the document has been signed. The cryptographic signature can be generated with a digest of the document, the identity, and a cryptographic key associated with the user. The system can inspect the digest of the document, the cryptographic key, and the identity associated with the document to verify authenticity of the document and the identity of the user.

20 Claims, 9 Drawing Sheets

Signature (public)
any input can be verified with signature
without revealing from signature

Related U.S. Application Data continuation of application No. 16/856,907, filed on Apr. 23, 2020, now Pat. No. 11,210,379, which is a continuation of application No. 15/909,416, filed on Mar. 1, 2018, now Pat. No. 10,671,712.

(60) Provisional application No. 62/465,533, filed on Mar. 1, 2017.

(51) Int. Cl.
  H04L 9/08 (2006.01)
  H04L 9/40 (2022.01)
  *G06F 16/93* (2019.01)
  *H04L 9/00* (2022.01)

(56) References Cited

U.S. PATENT DOCUMENTS

| | | | |
|---|---|---|---|
| 6,367,013 | B1 | 4/2002 | Bisbee et al. |
| 6,553,494 | B1* | 4/2003 | Glass .............. G06F 21/64 |
| | | | 713/176 |
| 6,671,805 | B1 | 12/2003 | Brown et al. |
| 6,959,382 | B1* | 10/2005 | Kinnis ............. H04L 9/3247 |
| | | | 713/168 |
| 7,111,173 | B1 | 9/2006 | Scheidt |
| 7,194,618 | B1 | 3/2007 | Suominen |
| 7,934,098 | B1* | 4/2011 | Hahn ............... G06Q 50/18 |
| | | | 713/180 |
| 8,554,681 | B1 | 10/2013 | Wieder |
| 8,843,997 | B1 | 9/2014 | Hare |
| 9,178,862 | B1 | 11/2015 | Daniel |
| 9,197,638 | B1* | 11/2015 | Livesay .......... H04L 63/0807 |
| 9,286,403 | B2 | 3/2016 | Papa et al. |
| 9,436,668 | B2 | 9/2016 | Dunn et al. |
| 9,596,088 | B1 | 3/2017 | Oakes, III |
| 9,855,785 | B1 | 1/2018 | Nagelberg et al. |
| 9,866,393 | B1* | 1/2018 | Rush ................ H04L 9/3236 |
| 9,967,750 | B1 | 5/2018 | Fernandez et al. |
| 10,245,875 | B1 | 4/2019 | Nagelberg et al. |
| 10,277,400 | B1 | 4/2019 | Griffin et al. |
| 10,320,807 | B2 | 6/2019 | Khan |
| 10,333,705 | B2 | 6/2019 | Smith et al. |
| 10,333,706 | B2 | 6/2019 | Smith et al. |
| 10,341,353 | B1 | 7/2019 | Yaacoby et al. |
| 10,396,985 | B1* | 8/2019 | Nagelberg .......... H04L 9/3247 |
| 10,419,420 | B2 | 9/2019 | Steeves et al. |
| 10,462,131 | B2 | 10/2019 | Votaw et al. |
| 10,469,487 | B1 | 11/2019 | Griffin et al. |
| 10,671,712 | B1 | 6/2020 | Lindley et al. |
| 10,785,022 | B2* | 9/2020 | Watanabe ............ G06F 21/73 |
| 11,055,387 | B2 | 7/2021 | Gonser et al. |
| 11,100,240 | B2 | 8/2021 | O'Hare et al. |
| 11,210,379 | B1 | 12/2021 | Lindley et al. |
| 11,405,387 | B1* | 8/2022 | Griffin ............. H04L 9/0866 |
| 11,544,367 | B2* | 1/2023 | Ebrahimi ........... H04W 12/06 |
| 12,093,412 | B2* | 9/2024 | O'Hare .............. H04L 63/0428 |
| 2001/0002485 | A1* | 5/2001 | Bisbee .............. G07F 7/12 |
| | | | 705/51 |
| 2002/0016910 | A1* | 2/2002 | Wright ............... H04L 67/34 |
| | | | 713/150 |
| 2003/0070072 | A1 | 4/2003 | Nassiri |
| 2004/0039909 | A1 | 2/2004 | Cheng |
| 2004/0139327 | A1* | 7/2004 | Brown ............... G06F 21/34 |
| | | | 713/176 |
| 2004/0236694 | A1 | 11/2004 | Tattan et al. |
| 2005/0120217 | A1 | 6/2005 | Fifield et al. |
| 2005/0125656 | A1 | 6/2005 | Mallal et al. |
| 2005/0138382 | A1 | 6/2005 | Hougaard et al. |
| 2005/0154886 | A1 | 7/2005 | Birk et al. |
| 2005/0193211 | A1 | 9/2005 | Kurose |
| 2006/0050932 | A1 | 3/2006 | Tumey et al. |
| 2008/0072334 | A1 | 3/2008 | Bailey et al. |
| 2008/0150678 | A1 | 6/2008 | Giobbi et al. |
| 2008/0172715 | A1 | 7/2008 | Geiger et al. |
| 2008/0209313 | A1 | 8/2008 | Gonser |
| 2009/0097657 | A1 | 4/2009 | Scheidt et al. |
| 2009/0235082 | A1* | 9/2009 | Garrett ............. H04L 9/3231 |
| | | | 713/176 |
| 2011/0213700 | A1* | 9/2011 | Sant'Anselmo ..... G06Q 20/10 |
| | | | 235/487 |
| 2012/0215669 | A1 | 8/2012 | Lieberman et al. |
| 2012/0323717 | A1 | 12/2012 | Kirsch |
| 2013/0015236 | A1 | 1/2013 | Porter et al. |
| 2013/0174239 | A1 | 7/2013 | Kim et al. |
| 2013/0297943 | A1 | 11/2013 | Hackler et al. |
| 2013/0325728 | A1* | 12/2013 | Bialostok ........... G06Q 10/06 |
| | | | 705/311 |
| 2014/0047560 | A1 | 2/2014 | Meyer et al. |
| 2014/0157381 | A1 | 6/2014 | Disraeli |
| 2014/0164542 | A1 | 6/2014 | McCabe et al. |
| 2014/0359722 | A1* | 12/2014 | Schultz ............. H04L 63/0861 |
| | | | 726/5 |
| 2014/0373093 | A1 | 12/2014 | Wood et al. |
| 2015/0039893 | A1 | 2/2015 | Buldas et al. |
| 2015/0143218 | A1 | 5/2015 | Peterson et al. |
| 2015/0143219 | A1 | 5/2015 | McCabe et al. |
| 2015/0154597 | A1 | 6/2015 | Bacastow |
| 2015/0161586 | A1 | 6/2015 | Bailey |
| 2015/0227924 | A1 | 8/2015 | Grigg et al. |
| 2015/0256973 | A1 | 9/2015 | Raounak |
| 2016/0072802 | A1 | 3/2016 | Hoyos |
| 2016/0078277 | A1* | 3/2016 | Sprigg ............... G06F 21/32 |
| | | | 382/119 |
| 2016/0170950 | A1 | 6/2016 | Malden |
| 2016/0191515 | A1 | 6/2016 | Kim et al. |
| 2016/0226830 | A1 | 8/2016 | Steeves |
| 2016/0292804 | A1 | 10/2016 | Takahashi et al. |
| 2017/0033932 | A1* | 2/2017 | Truu ................ H04L 9/3239 |
| 2017/0033933 | A1 | 2/2017 | Haber et al. |
| 2017/0075938 | A1 | 3/2017 | Black et al. |
| 2017/0103472 | A1 | 4/2017 | Shah |
| 2017/0243193 | A1 | 8/2017 | Manian et al. |
| 2017/0286768 | A1* | 10/2017 | Livesay ............. H04W 12/02 |
| 2017/0301047 | A1 | 10/2017 | Brown et al. |
| 2017/0344988 | A1 | 11/2017 | Cusden et al. |
| 2018/0075028 | A1 | 3/2018 | Ruschin et al. |
| 2018/0152297 | A1 | 5/2018 | Fielding et al. |
| 2018/0173719 | A1 | 6/2018 | Bastide et al. |
| 2018/0218339 | A1* | 8/2018 | Jenkins ............. G06Q 30/018 |
| 2018/0288040 | A1* | 10/2018 | Kursun .............. H04L 63/0861 |
| 2018/0337787 | A1 | 11/2018 | Uhr et al. |
| 2019/0097812 | A1 | 3/2019 | Toth |
| 2019/0158296 | A1 | 5/2019 | Haber et al. |
| 2019/0197502 | A9 | 6/2019 | Baron |
| 2021/0258294 | A1 | 8/2021 | Lyman et al. |
| 2023/0045774 | A9* | 2/2023 | Gunther ............. G06Q 50/18 |
| 2024/0241937 | A1* | 7/2024 | Ruma ............... G06V 40/50 |

* cited by examiner

VIRTUAL NOTARIZATION USING CRYPTOGRAPHIC TECHNIQUES AND BIOMETRIC INFORMATION

CROSS-REFERENCE TO RELATED APPLICATIONS

This application is a continuation of U.S. patent application Ser. No. 17/523,822 filed Nov. 10, 2021, now allowed, which is a continuation of U.S. patent application Ser. No. 16/856,907 filed Apr. 23, 2020, issued as U.S. Pat. No. 11,210,379 on Dec. 28, 2021, which is a continuation of U.S. patent application Ser. No. 15/909,416 filed Mar. 1, 2018, issued as U.S. Pat. No. 10,671,712 on Jun. 2, 2020, entitled "VIRTUAL NOTARIZATION USING CRYPTOGRAPHIC TECHNIQUES AND BIOMETRIC INFORMATION," which is a non-provisional of and claims priority to U.S. Provisional Application No. 62/465,533 filed Mar. 1, 2017, entitled "VIRTUAL NOTARIZATION," all of which are hereby incorporated by reference in their entirety for all purposes.

BACKGROUND

Notarization traditionally requires a time-intensive process requiring an in-person visit to a notary public. To notarize a document, the notary generally reviews the document, verifies the identity of the person requesting the notarization, collects and verifies a signature, collects and records data (e.g., driver's license number), and completes the notarial certificate by providing a physical seal. The notarization process can be even lengthier when the document to be notarized is communicated electronically to the person, requiring the person to print the document, obtain the notary seal, scan the document into a computer, and send the notarized document to the requesting party. To complicate matters, each state can employ different legal requirements for notarization.

BRIEF DESCRIPTION OF THE DRAWINGS

Embodiments of the present disclosure will be described and explained through the use of the accompanying drawings, in which.

DETAILED DESCRIPTION

Methods and systems described herein use "virtual notarization," which comprises various techniques to shorten the notarization process yet maintain its integrity. Virtual notarization can be virtual in that the user is not required to physically appear in front of a notary public to have a document notarized (e.g., user electronically signs and corresponds with a notary over a video conference) and/or that the notarization process is completed without face-to-face human intervention (e.g., user cryptographically signs the document). In some embodiments, the notarization process is made simpler by using alternative authentication and signature techniques. For example, instead of a handwritten, in-person signature, the user can check a box, sign with a typed electronic signature, sign the document with a cryptographic signature, and/or provide a handwritten signature on a device using the user's finger or a compatible pen where the device is connected with a second device such that the signature is received in near real-time and drawn on the document. Instead of authenticating (verifying the user's identity) in person by inspecting a driver's license or other identification, the user's identity can be verified in other ways. For example, the user can partake in a video conference in the presence of a notary public in which biometric information is gathered or in which the notary can analyze the user's identification, and/or the user's login information can be used. In some embodiments, the user can authorize a third party to provide all the required information and then the document can be notarized without the user actually being present.

In some embodiments, certain technologies such as public-key cryptography, distributed ledgers, biometric techniques, and the creation and association of identities can provide an alternative to traditional notarization. That is, a human presence may not be required using certain techniques.

Figure 6:
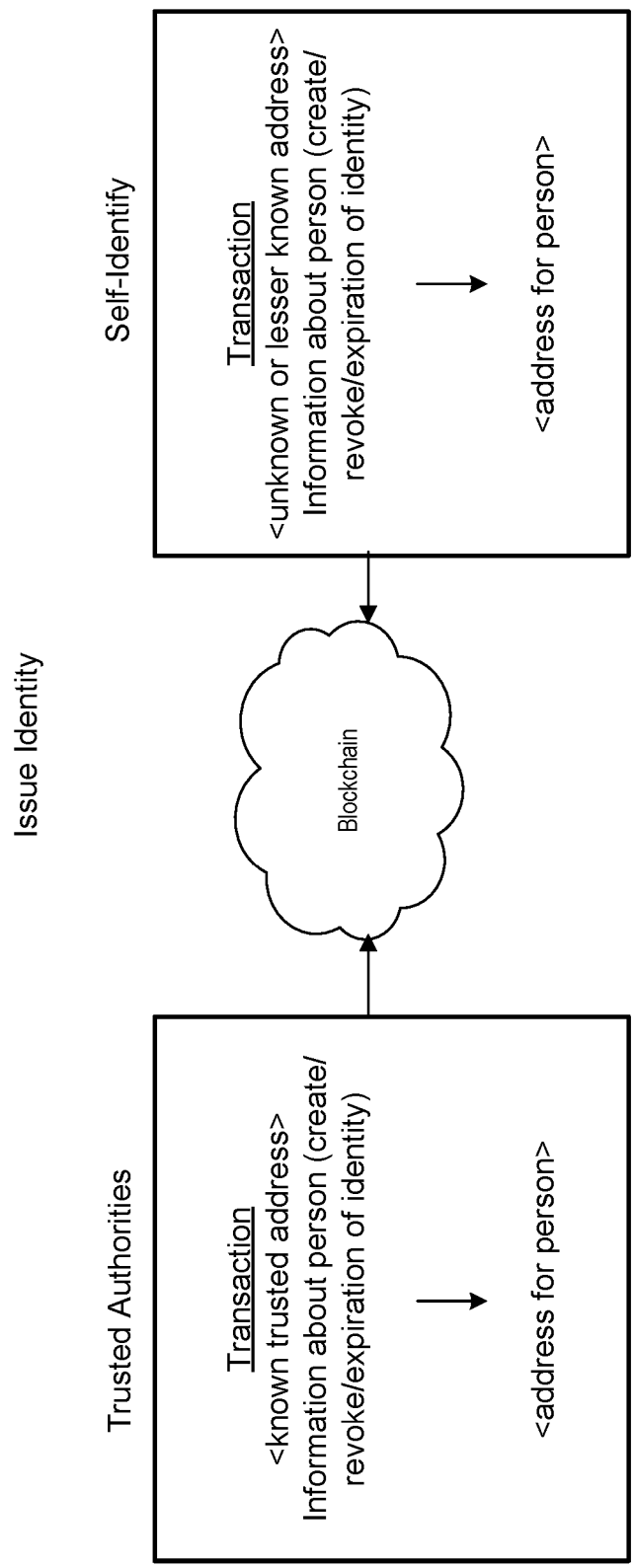
FIG. 6 is a diagram illustrating an example of how identities can be issued in accordance with various embodiments of the present disclosure.

The system can create identities or addresses of users. An identity or address of the user can be created after the user is authenticated through an alternate means, and in some embodiments, the identity can include authentication information such as biometric information. The identity or address links to a user and can be associated with documents or digests of documents. The identity or address and its association with a user can be published to a distributed ledger, as shown in FIG. 6. In some embodiments, an authority ("Trusted Authority") can "vet" identities/addresses. That is, a known identity on a ledger can record that another's identity is an actual person. For example, if the "known identity on the ledger" is a trusted system or a group consensus, then the claim is accepted by design to be sufficient proof. By adding a readable record for participants to see/check, the known identity conveys the verification to interested parties.

Ownership of a document, currency, or other items may be based on entries in distributed ledgers that are maintained by network nodes (e.g., computer connected to the network that validates and relays transactions). The distributed ledgers (e.g., blockchain for Bitcoin) can record entries for each exchange of the document and may be mathematically linked to key pairs. Using the Bitcoin blockchain as an example, the blockchain is a public ledger of all Bitcoin transactions that have ever been executed. The ledger grows as blocks are added to it with a new set of recorded data but maintains complete information about the addresses and balances from the first chain to the last chain.

Public-key cryptography requires a key pair where the two keys are mathematically linked. One key is a public key that can be freely shared. The other key is a private key that is not shared with the public. The public key is used to encrypt plaintext and to verify a digital signature. The private key is used to decrypt cipher text and to digitally sign transactions. Messages can be digitally signed by the sender's private key to authenticate the sender's identity. Then, the sender's digitally-signed message can be decrypted using the sender's public key to verify that the sender originated the message.

Figure 7:
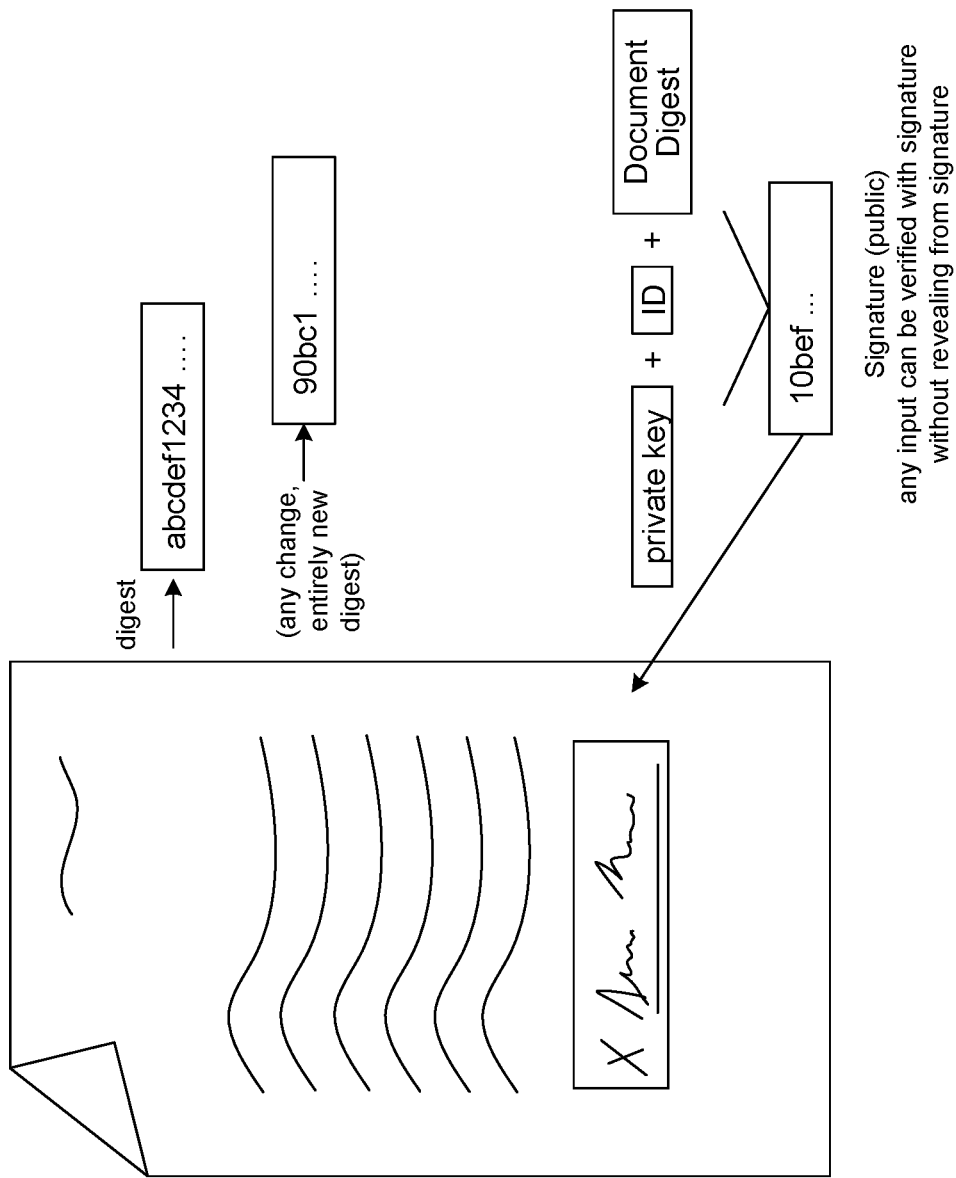
FIG. 7 is a diagram illustrating a document in accordance with various embodiments of the present disclosure.

In some embodiments, a digest of the document (i.e., hashed version of the document) can be created using, for example, SHA-256 Cryptographic Hash Algorithm. A user can cryptographically sign the digest of a document with the user's private key. In some embodiments, the signature of the digest can be recorded on a distributed ledger. The transaction can be broadcast via a message (e.g., in packets or other data structures) to nodes on a peer-to-peer network. The message can include information such as a history of the chain of title of the document. When a majority of the nodes in the network agree that the user has the proper chain of title, the digest of the document is transferred to the organization's account, and the ledger can be updated to indicate this change. Thus, instead of providing a handwritten signature, the user can provide a cryptographic signature that is verified. FIG. 7 illustrates a document, showing that a digest is a hashed version of the document. If anything in the document has changed, the hash of the document will be different. In some embodiments, a hash of the private key, the user's identity, and the document digest can be used to provide a signature for the document. These items can be verified via the signature without revealing the inputs used to produce the signature. That is, the private key, the user's identity, and the document digest can be inputs that cannot be transformed back from a signature but each can be independently verified against a signature.

In some embodiments, the user can cryptographically sign a document as well as provide biometric information apart from the cryptographic signature. When network nodes reach a consensus that the signature belongs to the user, and the user's biometric information is verified, the receiving entity can automatically consider the document notarized and place a notary seal, or electronic notary seal, on the document. In other embodiments, no notary seal or electronic notary seal is required. In some embodiments, the user's biometric data may be collected and analyzed to generate a cryptographic key. The cryptographic key may be re-generated for each access request or authentication request based on the user's biometric data. Generation of a cryptographic key based on biometric data can ensure that the generated key is unique to the user.

In an example of how these techniques may be used, the system can receive biometric information from a user and use the biometric information to authenticate the user. In some embodiments, characteristics can be extracted from the biometric information and compared to previously stored characteristics of biometric information associated with the user. The system can create and link an identity or an address to the user where the identity includes a biometric of the user (e.g., a thumbprint) or characteristics of the biometric information. The biometric data can be used to create an identity and prove identity. By measuring and establishing the biometric data, an identity may be created. For example, characteristics of the biometric information can be run through an algorithm that creates a private key. This key can be recreated each time the user provides biometric information that is run through the algorithm. Because the biometric data is a user characteristic (something that the user is or does), it is a link to the user who is already registered via a traditional user identity to include name and account information. Thus, the trusted authority can associate the private key created with the user's biometrics with a profile or an account of the user. The identity can be associated with the document or a digest of the document. The user can cryptographically sign the document using a private key that was generated using the user's biometric information.

The system can publish a record that the document was signed by the user to a distributed ledger. The organization issuing the document or a third party (e.g., the Department of Motor Vehicles) can receive the document and verify that the document is the same document, that the document has been signed by the user's cryptographic key, and that the document is associated with the user's identity. In some embodiments, the user's identity can be hidden in the distributed ledger by omitting personal information. Thus, while third parties can prove that the document was "notarized," third parties cannot use the person's identity relating to the notarized document to look for other recent activity of the person. For example, third parties cannot see who (e.g., a celebrity) is banking with a certain bank unless a record exists associating an address/identity with the celebrity's name or other identifying information on a public ledger. However, if ever audited, the celebrity and/or the bank could demonstrate that the celebrity or the bank owns the identity or a record proving the identity could exist privately somewhere.

This disclosure describes virtual notarization systems and methods designed to increase the efficiency and security of the notarization process. Various embodiments may provide one or more of the following technological improvements: (1) improved accuracy in verifying a user's identity; (2) increased efficiency in obtaining a validated signature; (3) real-time or near real-time notarization of documents; and (4) a record of a signed document that cannot be altered retrospectively.

In the following description, numerous specific details are set forth to provide a thorough understanding of embodiments of the present disclosure. However, it will be apparent to one skilled in the art upon reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, read-only memories (ROMs), random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

Figure 1:
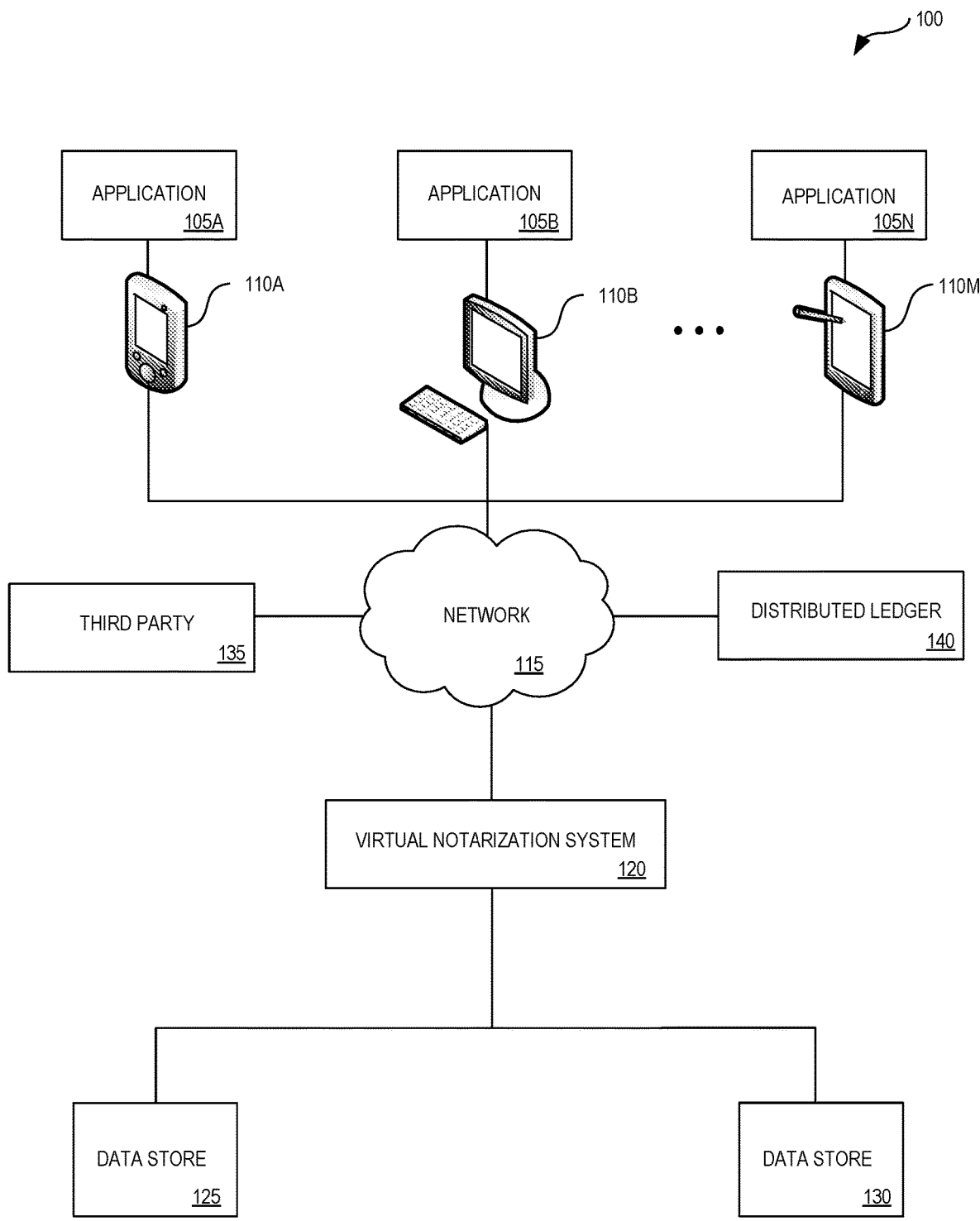
FIG. 1 illustrates an example of a network-based operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to third party 135, distributed ledger 140, virtual notarization system 120, and data stores 125 and 130.

Computing devices 110A-110M may be configured to communicate via network 115 with virtual notarization system 120. In some embodiments, computing devices 110A-110M can retrieve or submit information to virtual notarization system 120 and run one or more applications with customized content retrieved by virtual notarization system 120, distributed ledger 140, and data stores 125 and 130. For example, computing devices 110A-110M can execute a browser application or a customized client to enable interaction between the computing devices 110A-110M, virtual notarization system 120, distributed ledger 140, and data stores 125 and 130.

Network 115 can be any combination of local area and/or wide area networks using wired and/or wireless communication systems. Network 115 can be or could use any one or more of the following protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over network 115 may be represented using technologies, languages, and/or formats including hypertext markup language (HTML), or extensible markup language (XML). In addition, all or some links can be encrypted using conventional encryption technologies such as secure sockets layer (SSL), transport layer security (TLS), and Internet Protocol Security (IPSec).

Virtual notarization system 120 can run on one or more servers and can be used to send or receive documents to be notarized, provide notarization options, gather information, record information, notarize documents when a level of authentication has been reached, store profiles and/or policies in data stores 125 and 130, and/or perform other activities. In some embodiments, virtual notarization system 120 includes various data processing and analytic tools that allow it to determine a current level of authentication for the user using knowledge-based authentication and/or multifactor authentication. In some embodiments, virtual notarization system 120 is a server.

Virtual notarization system 120 may be communicably coupled with third party 135, distributed ledger 140, data stores 125 and 130, and computing devices 110A-110M, and may communicate, access, or receive data (e.g., device information, authentication information) from third party 135, computing devices 110A-110M, distributed ledger 140, and data stores 125 and 130. Virtual notarization system 120 may be associated with a membership organization (e.g., a financial institution or an insurance company), and the callers may be members of the membership organization.

Virtual notarization system 120 may be customized or calibrated based on state requirements for notarization. For example, the requirements for notarization for a person located in Virginia can be different than the notarization requirements for a person located in Wyoming.

Data stores 125 and 130 can be used to manage storage and access to user data such as user profiles, documents, previous virtual notarization procedures and history, website or mobile application search history, account information, registered devices, user preferences, location information, security questions and answers, biometric information, and other information. Data stores 125 and 130 may be data repositories of a set of integrated objects that are modeled using classes defined in database schemas. Virtual notarization system 120 and/or other servers may collect and/or access data from data stores 125 and 130. Data stores 125 and 130 may further include flat files that can store data. In some embodiments, there are numerous data stores such as data stores 125 and 130 and in other embodiments, only one data store exists.

Third party 135 may be any type of service to obtain information to verify the user's identity. For example, third party 135 could be a Department of Motor Vehicle (DMV) entity that stores a copy of a driver's license issued to a user, checks a driver's license number, or provides a photo that can be compared to an image of the user (e.g., while the user is on video conference with a representative). In some embodiments, third party 135 can receive a request from virtual notarization system 120 (or from the user) and provide the requested information or verify information.

Distributed ledger 160 records transactions such as the exchange of a document or digest of a document or the signing of a document. When distributed ledger 160 receives a transaction signed with the proper key from the user or from virtual notarization system 120 and the transaction is verified by network nodes, distributed ledger 160 associates the document or digest of the document with the proper addressed account and records the transaction.

Figure 2:
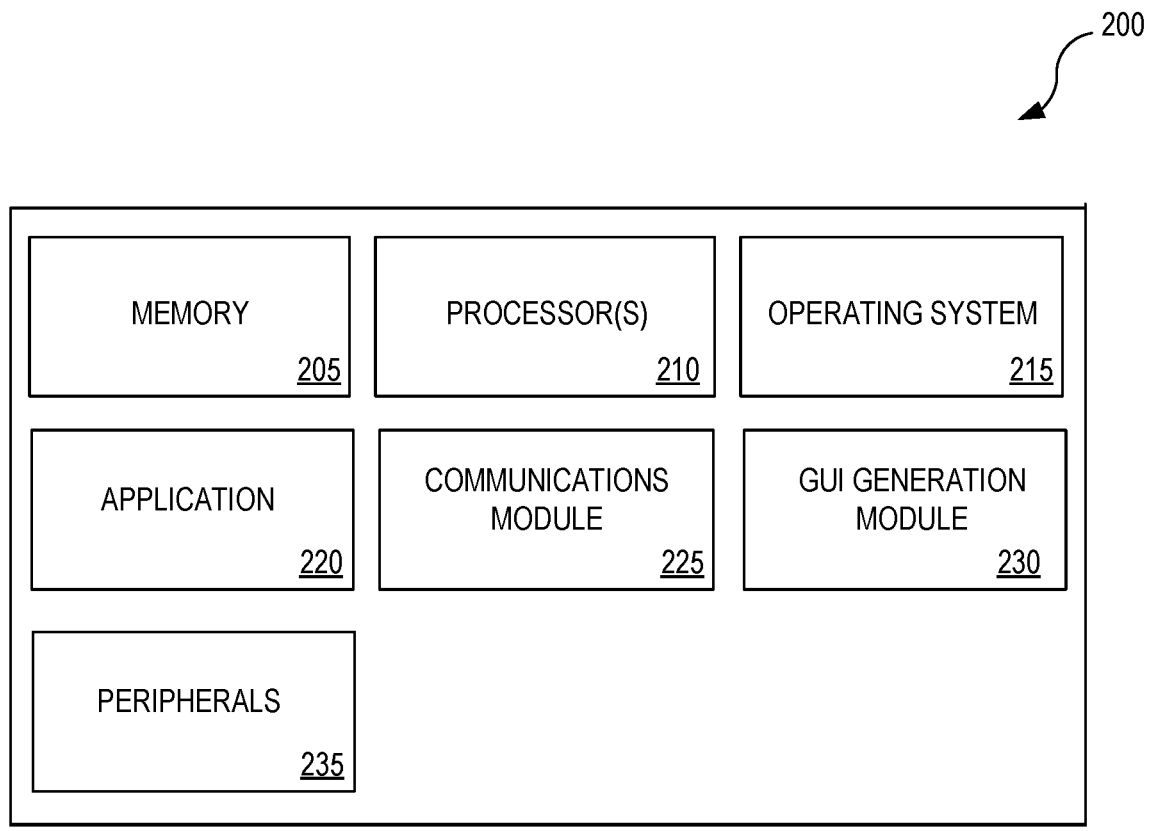
FIG. 2 illustrates various components of a computing device that may be used in accordance with one or more embodiments of the present disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, communications module 225, graphical user interface (GUI) generation module 230, and peripheral interface module 230. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory (RAM), memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), double data rate random-access memory (DDR RAM), small outline dual inline memory modules (SODIMMs), EPROM, EEPROM, compact discs, DVDs, and/or the like. In accordance with some embodiments, memory 205 may include one or more disk drives or flash drives; one or more databases; one or more tables; or one or more files, local cache memories, processor cache memories, relational databases, flat databases; and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, communications module 225, GUI generation module 230, and peripheral interface module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with virtual notarization system 120. For example, application 220 can include a financial service application, a money transfer application, a social networking application, and/or a gaming application.

Application 220 can access a server and/or a platform associated with an organization (e.g., virtual notarization system 120) to display documents, receive messages, display authentication requests and confirmations, and collect authentication information. For example, application 220 may be used to hold a video conference with a representative. Application 220 can allow a user to electronically sign a document (e.g., with a pen, finger, or typing) via the device and send the signed document to an entity in real-time or near real-time. In some embodiments, application 220 can receive biometric information (e.g., fingerprint, facial image, voice sample, hair sample) and analyze the biometric information or send (e.g., via communications module 225) the biometric information (or characteristics of the biometric information such as measurements) to virtual notarization system 120 to authenticate the user by comparing the biometric information (or characteristics of the biometric information) with previously collected biometric information (or characteristics of previously collected biometric information).

Communications module 225 can communicate with a third party (e.g., third party 135) and/or a server (e.g., virtual notarization system 120). For example, communications module 225 can receive requests from application 220 and communicate the requests or information (e.g., biometric information or characteristics) to the appropriate party, as well as receive responses to the requests. In some embodiments, communications module 225 can initiate an in-application call or video call to a representative to assist with notarization. Communications module 225 can send a document (e.g., loan, will) that needs to be notarized to a user, and the user can respond by requesting a video conference, sending a document cryptographically or e-signed, sending authentication information, and/or other responses. The request may be sent via an application or website. In some embodiments, virtual notarization system 120 may send a document that needs to be notarized and include a corresponding icon with that says "Start Notarization Process" that includes instructions on what will be needed for the notarization. In some embodiments, the user is presented with a list of choices for notarization processes. In an example, the user can select "Participate in Video Conference with Representative" or "Provide Biometric Sample and Cryptographic Signature." In some embodiments, the list of choices depends on the user's location (e.g., residential address, location determined by user device) due to varying state requirements for notarization.

GUI generation module 230 can generate one or more GUI screens that allow for interaction with a user. In at least one embodiment, GUI generation module 230 generates a graphical user interface receiving and/or conveying information to the user. For example, the GUI generation module 230 may display a representative on a video conference call when assistance is needed. GUI generation module 230 can also display account status, documents, forms to be notarized, biometric feedback, a progress display of the notarization process, a process flow graph, instructions for completing the notarization process, automobile insurance cards, and other information for the user.

Peripheral interface module 235 can collect, store and analyze information collected by peripheral devices associated with the device. For example, peripheral interface module 235 can collect a signature from the user signed using an electronic pen, biometrics (e.g., fingerprint, image from camera, voice, blood, DNA), environmental information (e.g., sounds, location) or other information from a user. The peripheral devices can be a part of computing device 110 (e.g., camera) or can be attached to computing device 110 (e.g., blood analyzing device). Such information can be used to create a cryptographic key, authenticate the user, among other services.

Figure 3:
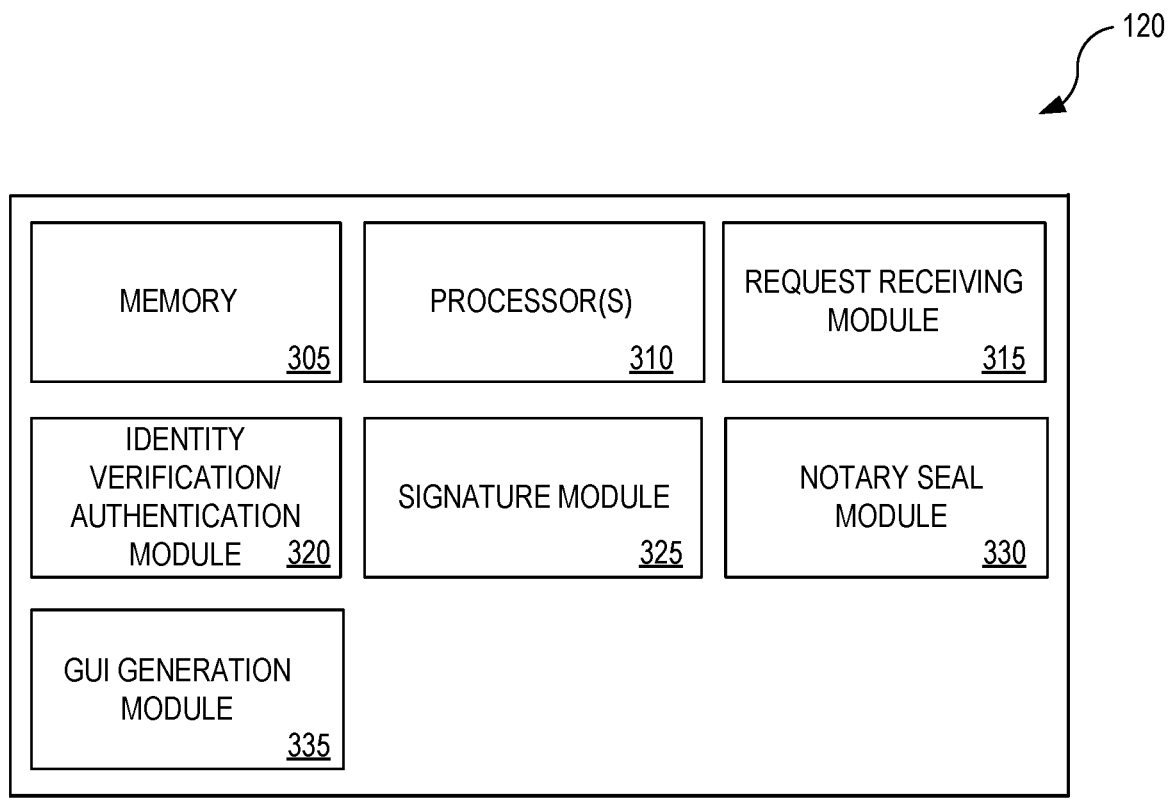
FIG. 3 illustrates various components of a virtual notarization system that may be used in accordance with various embodiments of the present disclosure.

FIG. 3 illustrates a set of components within virtual notarization system 120 according to one or more embodiments of the present disclosure. According to the embodiments shown in FIG. 3, virtual notarization system 120 can include memory 305, one or more processors 310, request receiving module 315, identity verification/authentication module 320, signature module 325, notary seal module 330, and GUI generation module 335. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of request receiving module 315, identity verification/authentication module 320, signature module 325, notary seal module 330, and GUI generation module 335.

Request receiving module 315 can receive a request for notarization of a document. Such request can be received from a communication module in a device after the virtual notarization system 120 or other system requests that a document be notarized.

Identity verification/authentication module 320 can receive information that verifies the user's identity and analyzes the information to confirm the user's identity. For example, identity verification module 320 can receive biometric information (e.g., voice sample, fingerprint, image) and determine whether the sample or characteristics of the sample matches previously stored biometric samples or characteristics of the samples. In some embodiments, a user participates in a video call with a representative and provides identity verification information via the video call (e.g., displays a driver's license, passport, birth certificate, military identification card) to the representative. Identity verification/authentication module 320 can request information from a third party to further verify the user's credentials. For example, identity verification/authentication module 320 can request the user's picture from a DMV database and compare this picture with an image of the user during the video conference call. In other embodiments, identity verification/authentication module 320 can send an image of the user and the user's name and request confirmation of a match from a third party.

Identity verification/authentication module 320 can use information gathered from the user's login information, if applicable. For example, if the user made an in-application video call, the user provided some type of verification to enter the application and such information can be used in connection with or in place of other identity verification/authentication information needed for the notarization process. Identity verification/authentication module 320 can determine whether the user is authenticated to an appropriate level of authentication. If not, identity verification/authentication module 320 can request additional information.

Signature module 325 can receive a signature from the user. In some embodiments, signature module 325 can receive a check box that the user checks or an electronic signature instead of requiring a handwritten signature. In such cases, the security requirement for authentication may be higher. That is, identity verification/authentication module 320 may require two biometric samples and a device fingerprint to verify the signer. In some embodiments, a sliding scale may be used-a lower security requirement for the signature may result in a higher security requirement for authentication. In some embodiments, the user can sign the document via a device with the user's finger or a pen. A device on the receiving end can receive the signature in near real-time or real-time and print it on the document.

In some embodiments, the document can be signed with a cryptographic signature, for example, signed by the user's private key. The organization can verify the signature using the signer's public key, and the transaction can be recorded to a distributed ledger when the network nodes reach a consensus. In some embodiments, the private key is created using biometric information, providing further authentication measures. In some embodiments, the user can provide biometric information to create the key using an application on a mobile device (e.g., facial recognition that unlocks a device). When the user's biometrics have been successfully verified, the key can be created from the biometrics used in the application.

Notary seal module 330 can provide a notary seal or an electronic notary seal, once identity verification/authentication module 320 has authenticated the user and signature module 320 has provided an acceptable signature from the user. The notary seal can be a digitally encoded seal such as a bar code, quick response code, or other identifying code. The digitally encoded seal can be encoded with data that is a hash of some or all of a document, indication of the source, a creation date/time of the document, date/time the document was applied to the document, indication of the topic of the document or other metadata.

GUI generation module 335 is capable of generating one or more GUI screens that allow interaction with a user. In at least one embodiment, GUI generation module 335 generates a graphical user interface receiving information from and/or conveying information to the user. For example, GUI generation module 335 can display a video of the user, a driver's license or other identification of the user, previous requests made by the user, documents, an electronic signature, or other information that can be used to electronically notarize a document.

Figure 4:
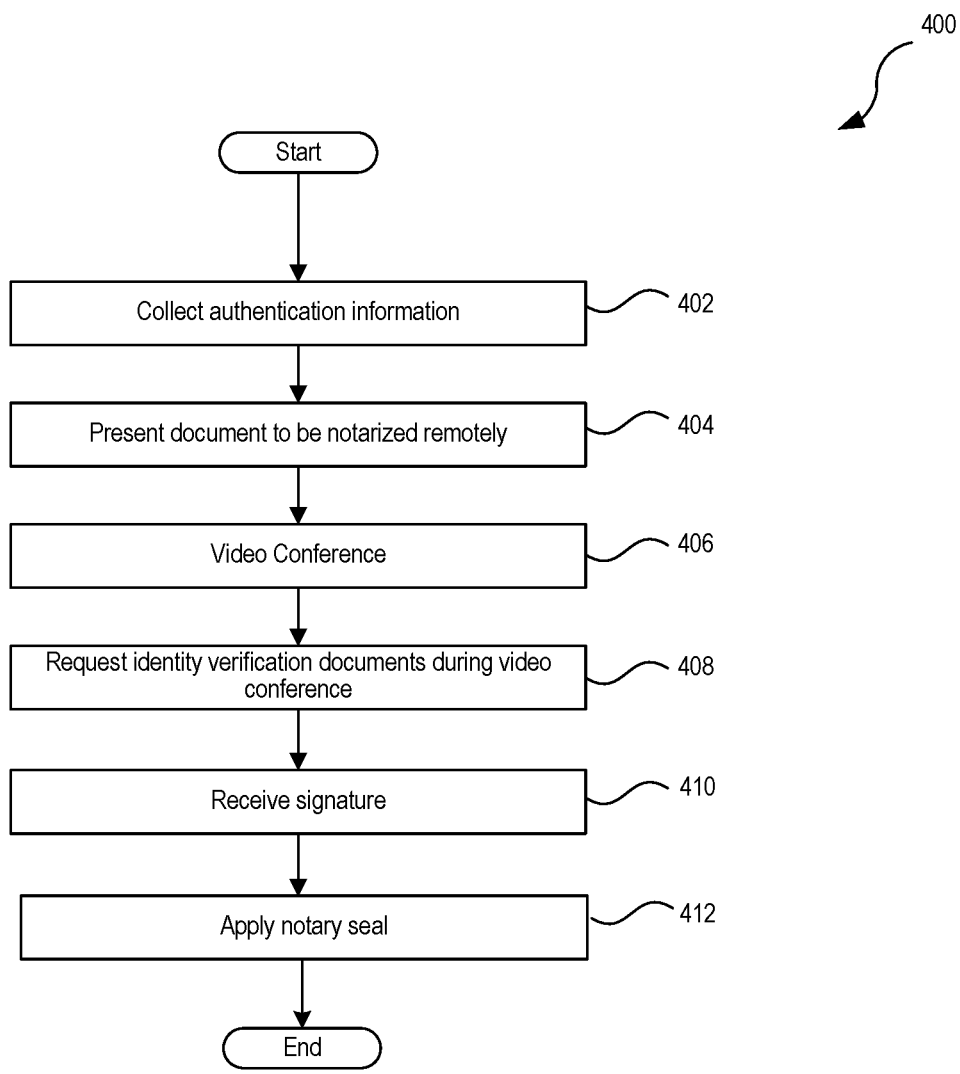
FIG. 4 is a flowchart illustrating a set of operations for notarization of a document using a video conference in accordance with various embodiments of the present disclosure.

FIG. 4 is a flowchart illustrating sets of operations 400 for notarization of a document using a video conference. In some embodiments, fewer than all of the operations in each set of operations are performed, whereas in other embodiments, additional operations are performed. Moreover, in some embodiments, the operations may be performed in different orders or in parallel. The operations can be performed by components 200 of computing device 110 illustrated in FIG. 2, by third party 135, and/or by various components of virtual notarization system 120 illustrated in FIG. 3.

Receiving operation 402 receives login information to a website portal, mobile application, kiosk, or other point of interaction. Login information can include username/password, biometric information (e.g., fingerprint), location, device fingerprint, and/or other authentication information. Presenting operation 404 presents the user with the document to be notarized. In some embodiments, presenting operation 404 further presents the user with a list of notarization options for signature and authentication. In some embodiments, the options are determined by the notary's location based on the requirements in the location (e.g., some states do not allow video conference notarization, some states may accept cryptographic signatures).

Conferencing operation 406 engages in a video conference between a notary and the user. During the video conference, the notary can verify the user's identity in requesting operation 408. For example, the notary can request the user to provide via the video conference various identity verification documents to fulfill the notary requirement. Examples of identity verification documents include government issued identification cards (e.g., social security card, birth certificate, driver's license, passport, military identification card), membership cards (e.g., gym, financial organization), financial instruments (e.g., credit card, debit card), biometric information (e.g., sample of hair or voice, image, fingerprint), username/password, location, cadence of speech or typing, and pressure of typing or writing. The notary can inspect the various identity verification documents via the video conference.

Receiving operation 410 receives a signature in accordance with the option selected or requested. Examples of electronic signatures include checking a box, typing the user's name, cryptographically signing the document, and signing via a device with a finger or pen. When the notary determines that the signature and the identity verification documents are sufficient to verify the identity of the user, the notary applies a notary seal to the document in applying operation 412. In some embodiments, the notary seal is a digitally encoded seal.

Figure 5:
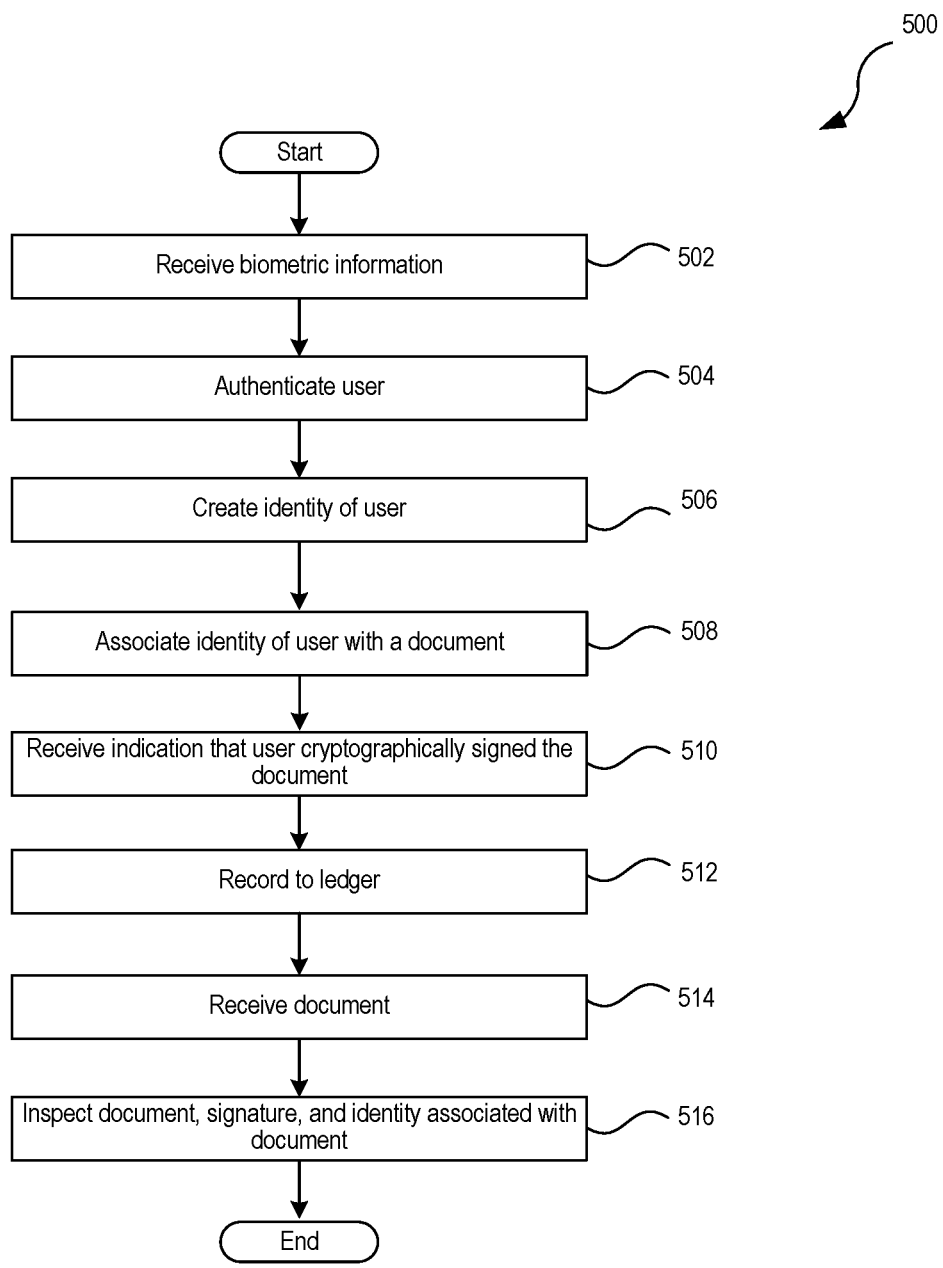
FIG. 5 is a flowchart illustrating a set of operations for virtual notarization of a document in accordance with various embodiments of the present disclosure.

FIG. 5 is a flowchart illustrating sets of operations 500 for virtual notarization of a document. In some embodiments, fewer than all of the operations in each set of operations are performed, whereas in other embodiments, additional operations are performed. Moreover, in some embodiments, the operations may be performed in different orders or in parallel. The operations can be performed by components 200 of computing device 110 illustrated in FIG. 2, by third party 135, and/or by various components of virtual notarization system 120 illustrated in FIG. 3.

Receiving operation 502 receives biometric authentication information such as a fingerprint, DNA sample, blood sample, hair sample, image, or voice sample. Authenticating operation 504 authenticates the user using previously stored biometric information collected from the user (or characteristics thereof). Creating operation 506 creates an address or identity of the user after the user has been authenticated. The address or identity can identify the user and can incorporate biometric information. Because the user has been authenticated, the address or identity is created for the user and can be stored on a notarizing server and/or published on a distributed ledger. In some embodiments, the identity is a public key, or a hash of a public key. In some embodiments, the public key can be hashed with the private key where the private key is created using the biometric information.

Associating operation 508 associates the user's identity or address with a document and can send a document to a user for signature. In some embodiments, a trusted authority can also "vet" an identity by tying an identity to a person. This can be done without necessarily stating that identity A is Jane Doe, but the trusted authority knows who identity A is and has a private record that identity A is Jane Doe. In some embodiments, the trusted entity is a service provider such as a financial institution. The financial institution retails member identity and biometric information for its customers. The financial institution can vet its members and have a longstanding relationship with them. The trusted entity can create a private record with an anonymous identity, but if needed the trusted entity can reveal the identity or act as a communication proxy to organizations with a need to know. In some embodiments, a record stating that identity A is Jane Doe is made public.

Upon receipt of the document, the user can cryptographically sign the document or a digest of the document. The cryptographic signature can be generated using a key created from the user's biometrics, and, in some cases, the same biometrics that were used to create the identity of the user are used to create the user's private key. In some embodiments, the system does not re-generate the user's cryptographic signature each time. In some embodiments, the user's signature is a hash of the digest of the document, the user's identity, and the user's private key. From the user's perspective, the user may see the document and click in a box or radio button to provide the cryptographic signature, while in the background, the system is generating the user's cryptographic signature using the user's biometric information and applying the cryptographic signature to the document. In some embodiments, when the user cryptographically signs the documents, the signing transaction can be recorded on a distributed ledger whereas in other embodiments, the transaction is not recorded on the distributed ledger when the user signs but is rather recorded on the distributed ledger after a trusted entity verifies the user's signature.

Receiving operation 510 receives an indication that the user cryptographically signed the document. The indication can be the cryptographically signed document being sent back to the system or stored on a distributed ledger. In some embodiments, if a request was made or a requirement existed for the identity to be made public, the trusted entity could add a record to reveal the identity publicly. Recording operation 512 publishes a record that the user cryptographically signed the document to a distributed ledger. This transaction can be recorded after the user's identity has been verified by a trusted entity. After the user has signed the document, the user can send the document back to the issuing entity or to a different entity (e.g., Department of Motor Vehicles). In some embodiments, a digest of the document or the cryptographically signed document may be recorded to the ledger. In some embodiments, a second party such as a witness or organization signs the document or a digest of the document with a cryptographic signature as well. Such signature can be inspected in inspecting operation 516. Receiving operation 514 receives the document or a digest of the document.

Inspecting operation 516 inspects the document or the digest of the document to ensure that nothing in the document has changed, that the document or digest of the document is signed using a valid cryptographic signature and that the cryptographic signature matches the cryptographic signature of the identity associated with the document. For example, the transaction can be inspected by validating a cryptographically signed document by using the signer's public key to reveal the hash of the document and then computing the hash of the original document to verify a match. This indicates the document must have been signed with the private key corresponding to the public key and that the document was not altered since it was signed. In some embodiments, inspecting operation 516 can be performed by a third party. The system or the third party can verify that the user's signature (and a second party's signature, if applicable) is valid, cryptographically sign the cryptographically signed document (i.e., acting as a notary) and record the signed document or digest of the document to a distributed ledger. Having a third party inspect the signed document and transaction generally provides the functions of a notary but allows the notarization process to occur asynchronously such that the user does not have to be in the presence of the notary. In other embodiments, inspecting operation 516 is performed by an organization simply to ensure that the correct user signed the document.

FIG. 6 is a diagram illustrating an example of how identities can be issued. The Trusted Authority has a known trusted address and is an entity who authenticates user, is trusted by many, and who issues transactions to link identities to people. The address for the person is provided by the person, and the person owns the public and private keys but keeps the private key secret. In some embodiments, the Trusted Authority can "vet" identities/addresses. That is, a known identity on a ledger can record that another's identity is an actual person. Self-identify has an unknown or lesser-known address and could establish a reputation as an issuer elsewhere or can be used internally by organizations. For self-identify transactions, the user's identity can be verified by looking to other documents in which the user's identity has been verified.

Figure 8:
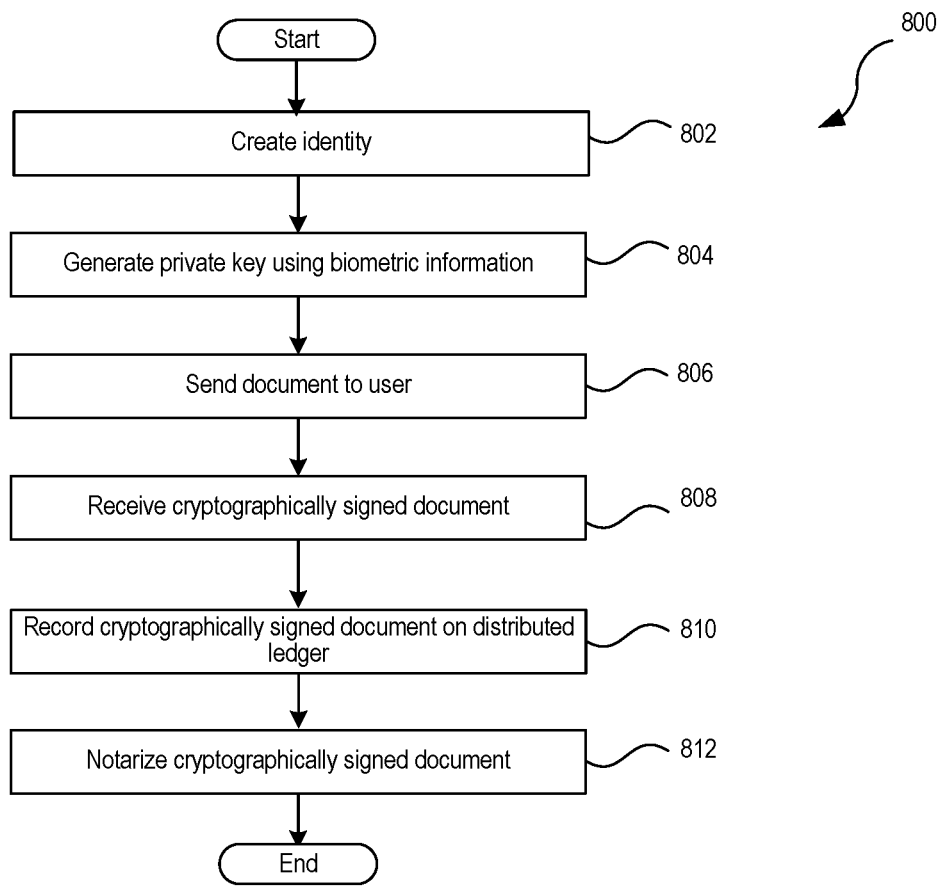
FIG. 8 is a flowchart illustrating a set of operations for notarization using cryptographic techniques.

FIG. 7 is a diagram illustrating a document, showing that a digest is a hashed version of the document. If anything in the document has changed, the hash of the document will be different. In some embodiments, a hash of the private key, the user's identity, and the document digest can be used to generate a signature for the document. These items can be verified via the signature without revealing the inputs used to produce the signature. That is, the private key, the user's identity, and the document digest can be inputs that cannot be transformed back from a signature but each can be independently verified against a signature. In some embodiments, FIG. 8 is a flowchart illustrating a set of operations 800 for notarization using cryptographic techniques. In some embodiments, fewer than all of the operations in each set of operations are performed, whereas in other embodiments, additional operations are performed. Moreover, in some embodiments, the operations may be performed in different orders or in parallel. The operations can be performed by components 200 of computing device 110 illustrated in FIG. 2, by third party 135, and/or by various components of virtual notarization system 120 illustrated in FIG. 3.

Creating operation 802 creates an identity of a user and associates the identity with an account or profile of the user. The identity can be published on a distributed ledger and/or stored in a database. In some embodiments, biometric data is used to generate the identity. Generating operation 804 generates a private key for a user using the user's biometric information. The private key can be associated with the identity. Sending operation 806 sends a document to the user for signature using the user's private key generated with biometrics. The user can provide biometric information to an application that can re-create the private key and cryptographically sign the document. In some embodiments, the cryptographic signature is generated using a digest of the document and the private key. In some embodiments, the cryptographic signature further includes the identity. Receiving operation 808 can receive the signed document along with an address (e.g., a public key, or a public key hashed with a private key). After verifying some or all of the parts of the signature, recording operation 810 can record the transaction (i.e., the cryptographically signed document) associated with a trusted entity address (i.e., entity that verified the signature). In some embodiments, the document can be considered notarized after recording operation 810. This is because the document can be verified and the identity can be verified independently. In some embodiments, additional operations occur for notarization. Notarizing operation 812 notarizes the signed document by a third party reviewing the signature and document and signing the document after verifying the user's signature and the document. In some embodiments, after the document is notarized, a transaction that includes metadata can be recorded on the blockchain. The metadata can describe the identities of the parties and include a digest of the document.

Computer System Overview

Figure 9:
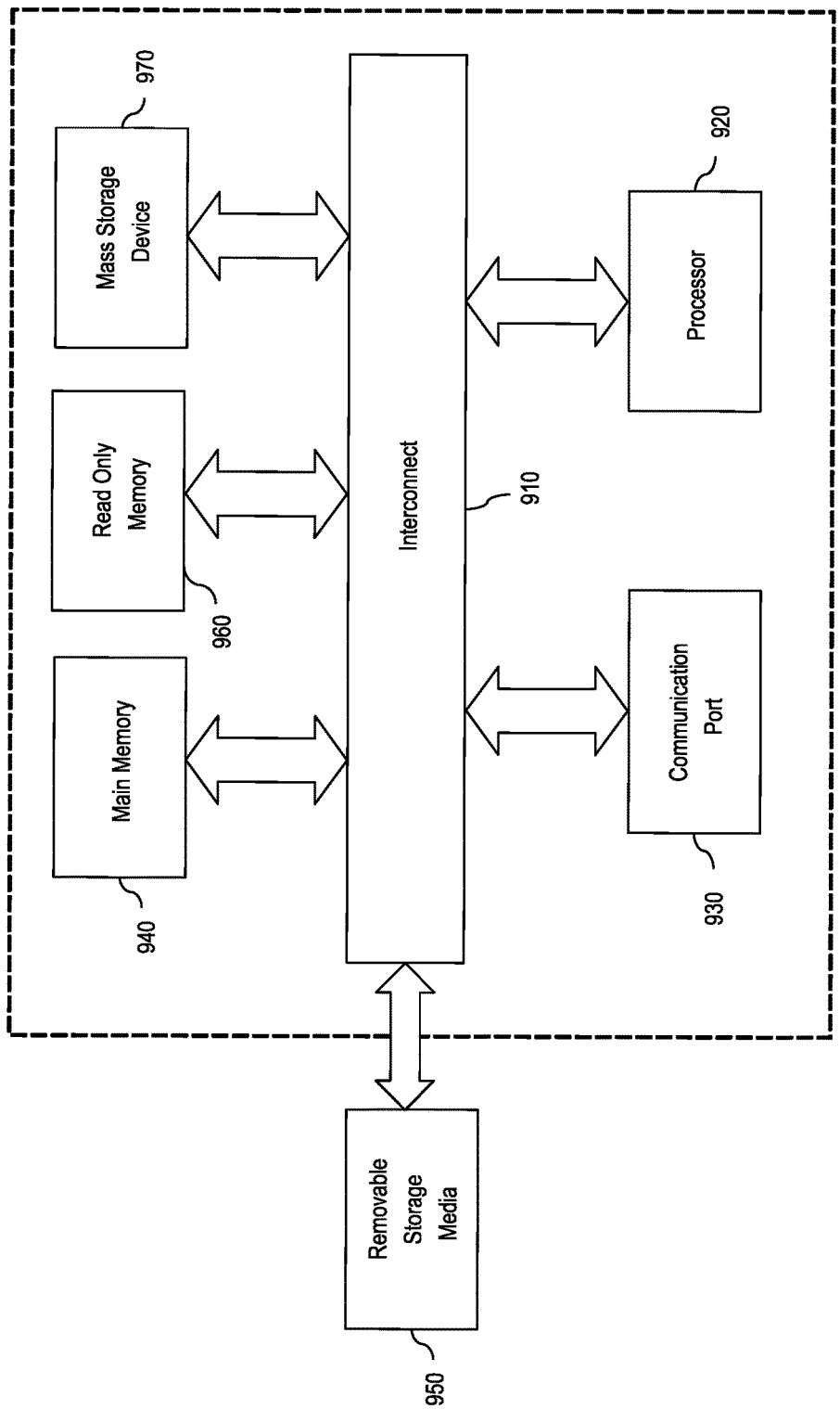
FIG. 9 illustrates an example of a computer system with which some embodiments of the present disclosure can be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system 900 includes an interconnect 910, at least one processor 920, at least one communication port 930, a main memory 940, a removable storage media 950, a read-only memory 960, and a mass storage device 970.

Processor(s) 920 can be any known processor, such as, but not limited to, an Intel® Itanium® or Itanium 2® processor(s), or AMD® Opteron® or Athlon MP® processor(s), or Motorola® lines of processors. Communication port(s) 930 can be a RS-232 port for use with a modem-based dial-up connection, a 10/100 Ethernet port, or a Gigabit port using copper or fiber. Communication port(s) 930 may be chosen depending on the type of network such as a Local Area Network (LAN), Wide Area Network (WAN), or any network to which the computer system 900 connects.

Main memory 940 can be random access memory (RAM) or any other dynamic storage device(s) commonly known in the art. Read-only memory 960 can be any static storage device(s) such as programmable read-only memory (PROM) chips for storing static information, such as instructions for processor(s) 920.

Mass storage device 970 can be used to store information and instructions. Mass storage devices that may be used include hard disks such as the Adaptec® family of SCSI (small computer system interface) drives, optical discs, an array of discs such as RAID (redundant array of independent disks), the Adaptec® family of RAID drives, or any other mass storage device.

Interconnect 910 communicatively couples processor(s) 920 with the other memory, storage, and communication blocks. Depending on the storage devices used, interconnect 910 can be a PCI/PCI-X- or SCSI-based system bus.

Removable storage media 950 can be any type of external hard drive, floppy drive, IOMEGA® Zip Drives, compact disc read-only memory (CD-ROM), compact disc re-writable (CD-RW), and/or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which a connection or a coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" encompasses being completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules; or a module can include one or more application programs.

The term "network" generally refers to a group of interconnected devices capable of exchanging information. A network may be as small as several personal computers on a local area network (LAN) or as large as the Internet, a worldwide network of computers. As used herein, "network" is intended to encompass any network capable of transmitting information from one entity to another. In some cases, a network may comprise multiple networks-even multiple heterogeneous networks-such as one or more border networks, voice networks, broadband networks, financial networks, service provider networks, Internet service provider (ISP) networks, and/or public switched telephone networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. More importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead, are meant to be examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from the personal computer to large network mainframes and servers.

In conclusion, the present disclosure discloses novel systems, methods, and arrangements for virtual notarization of documents. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments that have different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A method for authenticating a signature of a document, the method comprising:
    sending, from a user device associated with a user, a signature request including a cryptographic signature of a document,
        wherein the cryptographic signature is a first hash based on a digest of the document, at least one biometric characteristic of a user, and a cryptographic key associated with the user;
    sending, from the user device, a location of the user device;
    in response to a level of authentication, based on a type of the cryptographic signature and the location of the user device, required for notarization being greater than a level of authentication obtained with login authentication information of the user,
    receiving, by the user device, a request for additional authentication information to meet the level of authentication;
    sending, from the user device, the additional authentication information to meet the level of authentication; and
    in response to the additional authentication information being greater than or equal to the level of authentication required for notarization,
        receiving, by the user device, a notification that the document was digitally encoding with a seal,
            wherein the seal is encoded with a second hash of indication of a source of the document, and
            wherein a transaction is recorded on a distributed ledger for the notarized cryptographic signature and the document.

2. The method of claim 1, further comprising:
    sending, from the user device, biometric information of the user, wherein the biometric information is at least one of a heartbeat waveform, a fingerprint, voice sample, image, or a blood sample, wherein at least one of the login authentication information or the additional authentication information is based on the biometric information.

3. The method of claim 1, further comprising:
    sending, by the user device, the cryptographic key associated with the user.

4. The method of claim 1, further comprising:
    receiving, by the user device, the document and the notarized cryptographic signature.

5. The method of claim 1, further comprising:
    sending, from the user device associated with the user, the login authentication information to authenticate the user to a website or an application.

6. The method of claim 1, wherein the transaction is recorded on the distributed ledger in response to a trusted entity verifying the cryptographic signature.

7. The method of claim 1, wherein the cryptographic key is re-generated for each cryptographic signature.

8. A system comprising:
    one or more processors; and
    one or more memories storing instructions that, when executed by the one or more processors, cause the system to perform a process for authenticating a signature of a document, the process comprising:
        sending, from a user device associated with a user, a signature request including a cryptographic signature of a document,
            wherein the cryptographic signature is a first hash based on a digest of the document, at least one biometric characteristic of a user, and a cryptographic key associated with the user;
        sending, from the user device, a location of the user device;
        in response to a level of authentication, based on a type of the cryptographic signature and the location of the user device, required for notarization being greater than a level of authentication obtained with login authentication information of the user,
        receiving, by the user device, a request for additional authentication information to meet the level of authentication;
        sending, from the user device, the additional authentication information to meet the level of authentication; and in response to the additional authentication information being greater than or equal to the level of authentication required for notarization, receiving, by the user device, a notification that the document was digitally encoding with a seal, wherein the seal is encoded with a second hash of indication of a source of the document, and wherein a transaction is recorded on a distributed ledger for the notarized cryptographic signature and the document.

9. The system according to claim 8, wherein the process further comprises:

sending, from the user device, biometric information of the user, wherein the biometric information is at least one of a heartbeat waveform, a fingerprint, voice sample, image, or a blood sample, wherein at least one of the login authentication information or the additional authentication information is based on the biometric information.

10. The system according to claim 8, wherein the process further comprises:

sending, by the user device, the cryptographic key associated with the user.

11. The system according to claim 8, wherein the process further comprises:

receiving, by the user device, the document and the notarized cryptographic signature.

12. The system according to claim 8, wherein the process further comprises:

sending, from the user device associated with the user, the login authentication information to authenticate the user to a website or an application.

13. The system according to claim 8, wherein the transaction is recorded on the distributed ledger in response to a trusted entity verifying the cryptographic signature.

14. The system according to claim 8, wherein the cryptographic key is re-generated for each cryptographic signature.

15. A non-transitory computer-readable medium storing instructions that, when executed by a computing system, cause the computing system to perform operations for authenticating a signature of a document, the operations comprising:

sending, from a user device associated with a user, a signature request including a cryptographic signature of a document, wherein the cryptographic signature is a first hash based on a digest of the document, at least one biometric characteristic of a user, and a cryptographic key associated with the user;

sending, from the user device, a location of the user device;

in response to a level of authentication, based on a type of the cryptographic signature and the location of the user device, required for notarization being greater than a level of authentication obtained with login authentication information of the user, receiving, by the user device, a request for additional authentication information to meet the level of authentication;

sending, from the user device, the additional authentication information to meet the level of authentication; and in response to the additional authentication information being greater than or equal to the level of authentication required for notarization, receiving, by the user device, a notification that the document was digitally encoding with a seal, wherein the seal is encoded with a second hash of indication of a source of the document, and wherein a transaction is recorded on a distributed ledger for the notarized cryptographic signature and the document.

16. The non-transitory computer-readable medium of claim 15, wherein the operations further comprise:

sending, from the user device, biometric information of the user, wherein the biometric information is at least one of a heartbeat waveform, a fingerprint, voice sample, image, or a blood sample, wherein at least one of the login authentication information or the additional authentication information is based on the biometric information.

17. The non-transitory computer-readable medium of claim 15, wherein the operations further comprise:

sending, by the user device, the cryptographic key associated with the user.

18. The non-transitory computer-readable medium of claim 15, wherein the operations further comprise:

receiving, by the user device, the document and the notarized cryptographic signature.

19. The non-transitory computer-readable medium of claim 15, wherein the operations further comprise:

sending, from the user device associated with the user, the login authentication information to authenticate the user to a website or an application.

20. The non-transitory computer-readable medium of claim 15, wherein the transaction is recorded on the distributed ledger in response to a trusted entity verifying the cryptographic signature, and wherein the cryptographic key is re-generated for each cryptographic signature.

* * * * *